United States Patent
Won

(10) Patent No.: US 6,211,926 B1
(45) Date of Patent: Apr. 3, 2001

(54) REMOTE CONTROL APPARATUS FOR DIGITAL CABLE TELEVISION SYSTEM AND METHOD THEREOF

(75) Inventor: Kwang-Ho Won, Kyonggi-do (KR)

(73) Assignee: Hyundai Electronics Industries Co., Ltd., Kyoungki-do (KR)

( * ) Notice: Subject to any disclaimer, the term of this patent is extended or adjusted under 35 U.S.C. 154(b) by 0 days.

(21) Appl. No.: 08/969,402

(22) Filed: Nov. 13, 1997

(30) Foreign Application Priority Data

Nov. 20, 1996 (KR) .............................. 1996-55633

(51) Int. Cl.$^7$ ................................... G04N 7/173
(52) U.S. Cl. ................ 348/734; 348/558; 348/192; 348/7; 348/12; 455/4.2; 455/5.1; 455/6.2; 370/204; 370/275; 370/278; 370/282; 375/298; 375/310; 375/321; 375/268
(58) Field of Search ..................... 348/558, 192, 348/180, 470, 12, 13, 7, 10, 734, 726, 473, 483; 455/4.2, 5.1, 6.2, 6.3, 3.1; 370/204, 206, 275, 282, 278; 375/298, 310, 321, 277, 268–273; H04N 7/173

(56) References Cited

U.S. PATENT DOCUMENTS

| | | |
|---|---|---|
| 4,408,345 | 10/1983 | Yashiro et al. . |
| 4,461,032 | 7/1984 | Skerlos . |
| 4,558,358 | 12/1985 | Onda . |
| 5,099,348 | 3/1992 | Huddleston et al. . |
| 5,303,085 | 4/1994 | Rallison . |
| 5,329,364 | 7/1994 | Lee . |
| 5,341,216 | 8/1994 | Hoffart . |
| 5,355,188 | 10/1994 | Biles et al. . |
| 5,532,748 | * 7/1996 | Naimpally ........................ 348/432 |
| 5,548,357 | 8/1996 | Appel et al. . |
| 5,594,726 | 1/1997 | Thompson . |
| 5,642,382 | * 6/1997 | Juan ................................. 375/232 |
| 5,734,589 | * 3/1998 | Kostreski ......................... 345/327 |
| 5,784,683 | * 7/1998 | Sistanizadeh ................... 455/5.1 |
| 5,808,671 | * 9/1998 | Maycock ........................ 348/180 |
| 5,815,794 | * 9/1998 | Williams ......................... 348/12 |
| 5,822,676 | * 10/1998 | Hayashi ......................... 455/4.2 |
| 5,826,166 | * 10/1998 | Brooks ........................... 348/10 |
| 5,844,478 | * 12/1998 | Blatter ............................ 348/474 |
| 5,883,661 | * 3/1999 | Hoarty ............................ 348/7 |
| 5,936,968 | * 8/1999 | Lyons ............................. 370/503 |
| 6,104,442 | * 8/2000 | Patel ............................... 348/726 |
| 6,104,763 | * 8/2000 | Limberg ......................... 348/726 |

\* cited by examiner

Primary Examiner—Mark R. Powell
Assistant Examiner—Wesner Sajous
(74) Attorney, Agent, or Firm—R. Neil Sudol; Henry D. Coleman; William J. Sapone

(57) ABSTRACT

A remote control apparatus for a digital cable television system and a method thereof which are capable of inserting and transmitting a control data into each channel of a head end (HE) which is an output unit of a transmitting unit and modulating a state checking data of a receiving unit for a VSB/QAM receiving unit based on a QPSK method, thus upwardly transmitting the date, whereby it is possible to remotely control and monitor a VSB/QAM receiving unit without additionally allocating a frequency band width. The apparatus includes a transmitting unit for carrying a control signal on an MPEG transport stream of each channel for a remote control of a high definition television (HDTV) VSB/QAM receiving unit and transmitting the same, and remotely monitoring and controlling a state of the HDTV VSB/QAM receiving unit in accordance with a state checking signal from the HDTV VSB/QAM receiving unit, and a receiving unit for receiving a control signal from the transmitting unit, controlling the HDTV VSB/QAM receiving unit, modulating a state checking signal from the HDTV VSB/QAM and transmitting the thusly modulated signal to the transmitting unit.

9 Claims, 6 Drawing Sheets

Construction of Head End of a remote control.

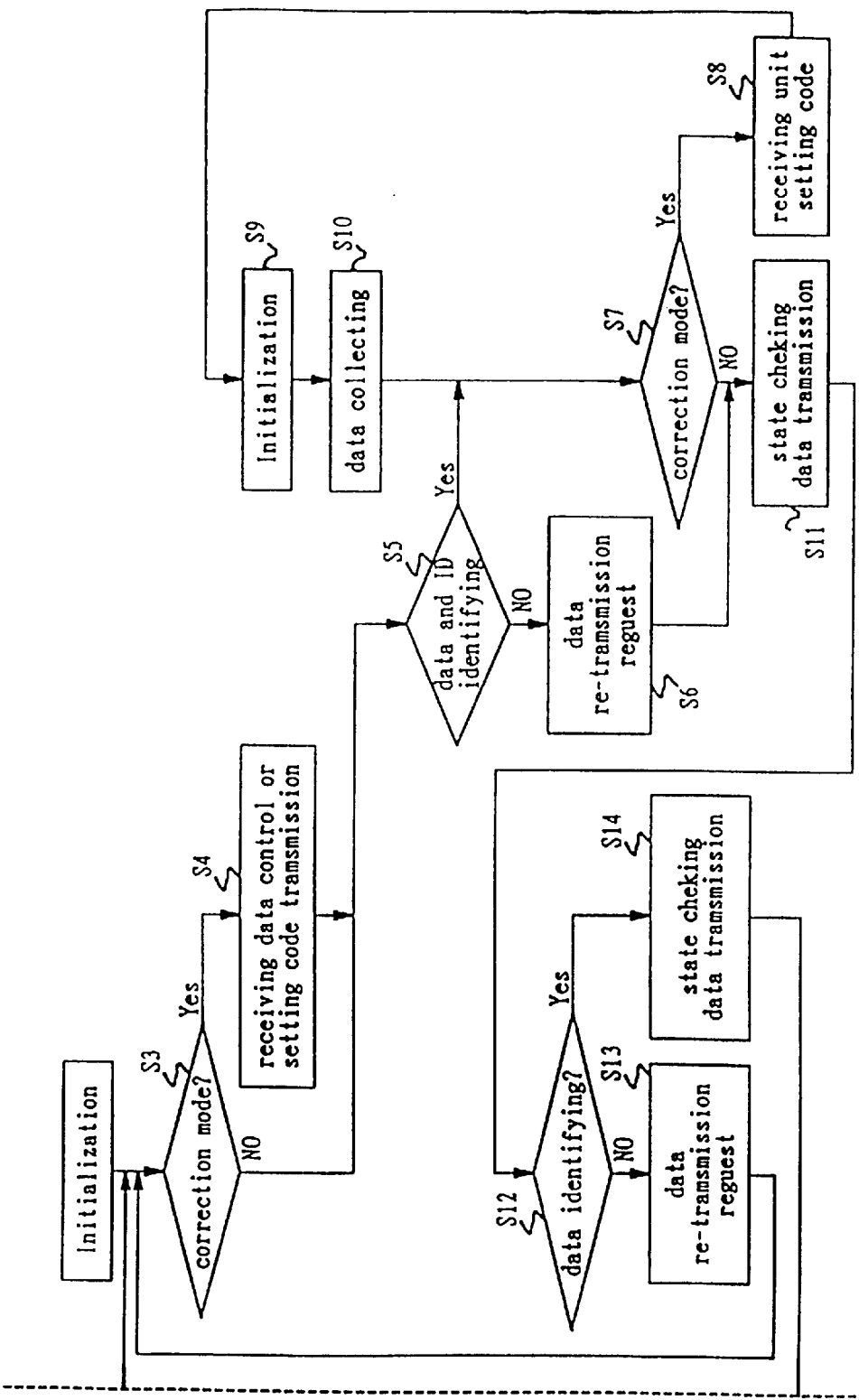

REMOTE CONTROL APPARATUS FOR DIGITAL CABLE TELEVISION SYSTEM AND METHOD THEREOF

BACKGROUND OF THE INVENTION

1. Field of the Invention

The present invention relates to a remote control apparatus for a digital cable television system and a method thereof, and in particular, to an improved remote control apparatus for a digital cable television system and a method thereof which are capable of remotely controlling and monitoring a HDTV (high definition television) VSB (vestigial side band)/QAM (quadrature amplitude modulation) receiving unit for a digital cable television network.

2. Description of the Conventional Art

In the conventional analog cable television system, a converter is managed using a subscriber management system. A channel is additionally allocated for managing subscribers, and a scramble and non-scramble control and management of a receiving unit is performed.

However, in the digital cable television system, a remote control and monitoring technique of the VSM and QAM for a digital channel transmission method is not regulated in detail.

SUMMARY OF THE INVENTION

Accordingly, it is an object of the present invention to provide an improved remote control apparatus for a digital cable television system and a method thereof which overcome the aforementioned problems encountered in the conventional art.

It is another object of the present invention to provide an improved remote control apparatus for a digital cable television system and a method thereof which are capable of inserting and transmitting a control data into each channel of a head end (HE) which is an output unit of a transmitting unit and modulating a state checking data of a receiving unit for a VSB/QAM receiving unit based on a QPSK (quadrature phase shift keying) method, thus upwardly transmitting the data, whereby it is possible to remotely control and monitor a VSB/QAM receiving unit without additionally allocating a frequency band width.

In order to achieve the above objects, there is provided a remote control apparatus for a digital cable television system which includes a transmitting unit for carrying a control signal on an MPEG transport stream of each channel for a remote control of a high definition television (HDTV) VSB/QAM receiving unit and transmitting the same, and remotely monitoring and controlling a state of the HDTV VSB/QAM receiving unit in accordance with a state checking signal from the HDTV VSB/QAM receiving unit, and a receiving unit for receiving a control signal from the transmitting unit, controlling the HDTV VSB/QAM receiving unit, modulating a state checking signal from the HDTV VSB/QAM and transmitting the thusly modulated signal to the transmitting unit, wherein the transmitting means includes an MPEG encoder for encoding a base band and video/audio signal of each channel into the MPEG transport stream, a VSB/QAM modulator for modulating an output signal from the MPEG encoder, a multiplexer for multiplexing an output signal from the VSB/QAM modulator of each channel, a diplex filter for preventing an upward signal from being influenced when transmitting the output signal from the multiplexer to the receiving unit through the transmission network, a master modem for demodulating a signal from the receiving unit through the diplex filter and outputting a transmission signal to the MPEG encoder, and a remote controller connected with the master modem through a communication cable for remotely monitoring a state of the HDTV VSB/QAM receiving unit in accordance with a state checking signal from the HDTV VSB/QAM receiving unit through the master modem, and wherein the receiving means includes a diplex filter for preventing an upward signal from being influenced by a downward signal received from the head end through a transmission network which head end is an output unit of the transmitting unit, a tuner for tuning the downward signal from the diplex filter and outputting an IF signal, a signal separator for a downward signal from the diplex filter to the tuner and an additionally connected external terminal, a signal processor for processing an IF signal from the tuner and outputting a base band, video/audio signal, and a control signal, a state checking unit for outputting a state checking signal of the HDTV VSB/QAM receiving unit, a controller for controlling the HDTV VSB/QAM receiving unit in accordance with a control signal from the signal processing unit and outputting a state checking signal from the state checking unit, and a slave modem for QPSK-demodulating a state checking signal from the controller and outputting to the diplex filter.

In order to achieve the above objects, there is provided a remote control method for a digital cable television system which includes the steps of transmitting a functional code and data control code/setting code from a remote controller to a master modem after an initialization, judging whether data received is corrected by the master modem and transmitting a receiving unit data control or setting code to a slave modem in correction mode, identifying a data received and an ID, requesting a data re-transmission to a master modem when there is an error in the data received from the slave modem, judging whether the current mode is a correction mode when there is not an error therein initializing a receiving unit after a receiving setting code is received when the current mode is a correction mode as a result of the judgement, correcting data, and transmitting the state checking data to the master modem when the current mode is not a correction mode, identifying a data transmitted from the slave modem in the master modem, requesting data re-transmission when there is not an error in the data and transmitting a state checking data to the remote controller when there is not an error, and checking and diagnosing the data transmitted thereto, performing a receiving unit control code when there is an error in the data, and processing, storing and displaying the data when there is not an error therein.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
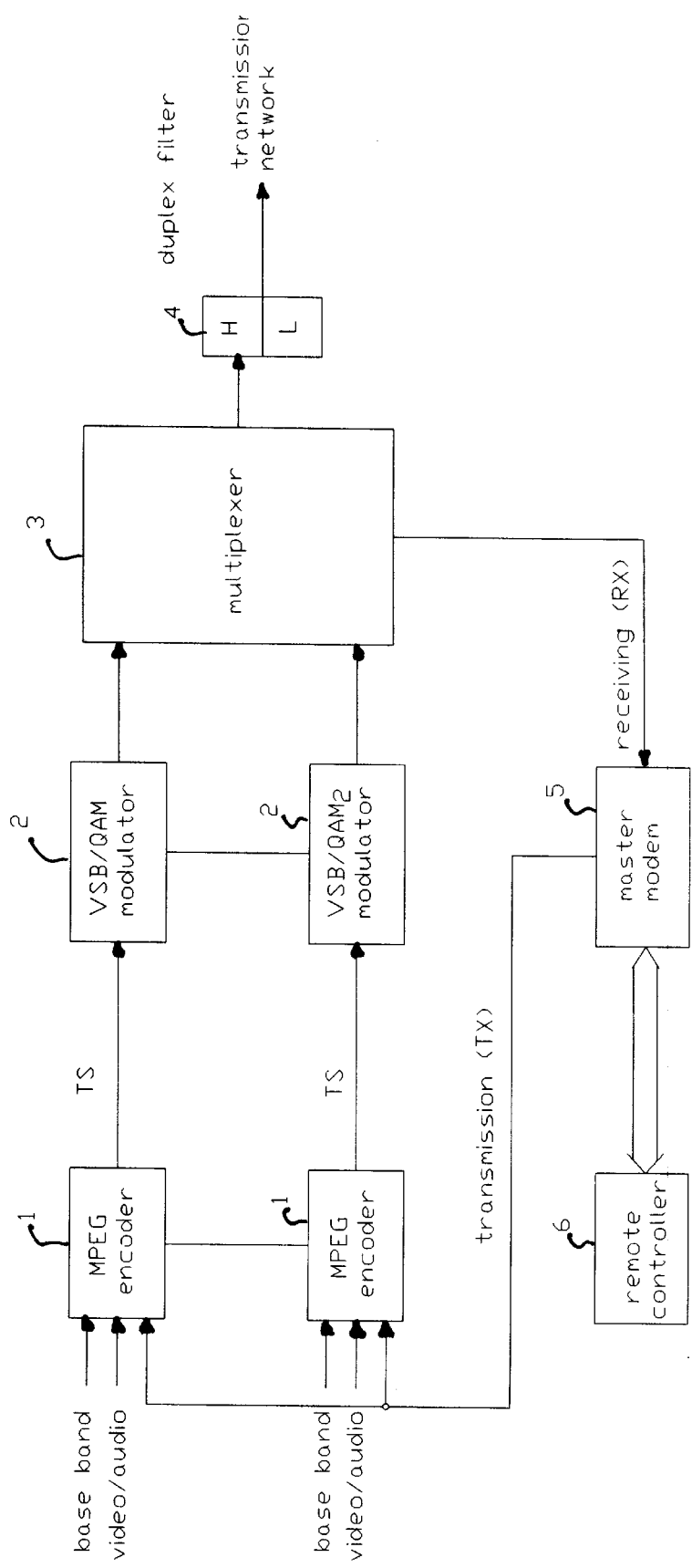
FIG. 1 is a block diagram illustrating the construction of a head end (HE) of a remote control apparatus for a digital cable television system according to the present invention.

FIG. 1 illustrates a head end (HE) of a remote control apparatus for a digital CATV system according to the present invention which includes an MPEG encoder 1 for encoding a base band video and audio signal from each channel into an MPEG transport stream (TS), a VSB/QAM modulator 2 for modulating an output from the MPEG encoder 1, a multiplexer 3 for multiplexing an output from the VSB/QAM modulator 2, a diplex filter 4 for preventing an upward signal from being influenced when transmitting the output from the multiplexer 3 to a receiving unit through a transmission network, a master modem 5, which acts as a QPSK receiving unit, for modulating the signal from the receiving unit through the diplex filter 4 and outputting a control signal ID to the MPEG encoder 1, and a remote controller connected with the master modem 5 through an RS-232C or RS-422 cable for remotely monitoring the state of the receiving unit in accordance with a state checking signal from the receiving unit through the master modem 5.

Figure 2A:
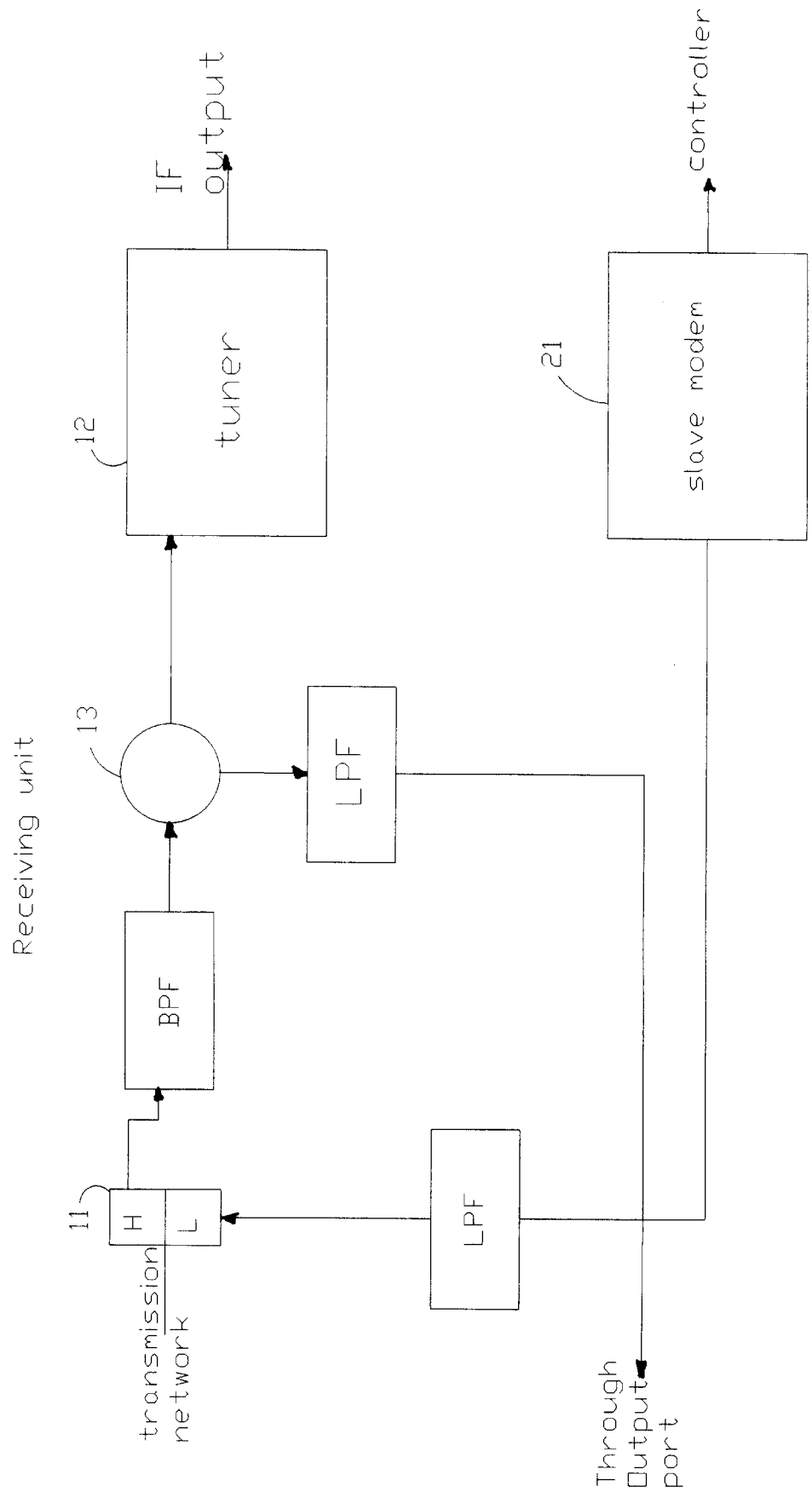
FIGS. 2A and 2B are block diagrams illustrating the construction of a receiving unit of a remote control apparatus for a digital cable television according to the present invention.
Figure 2B:
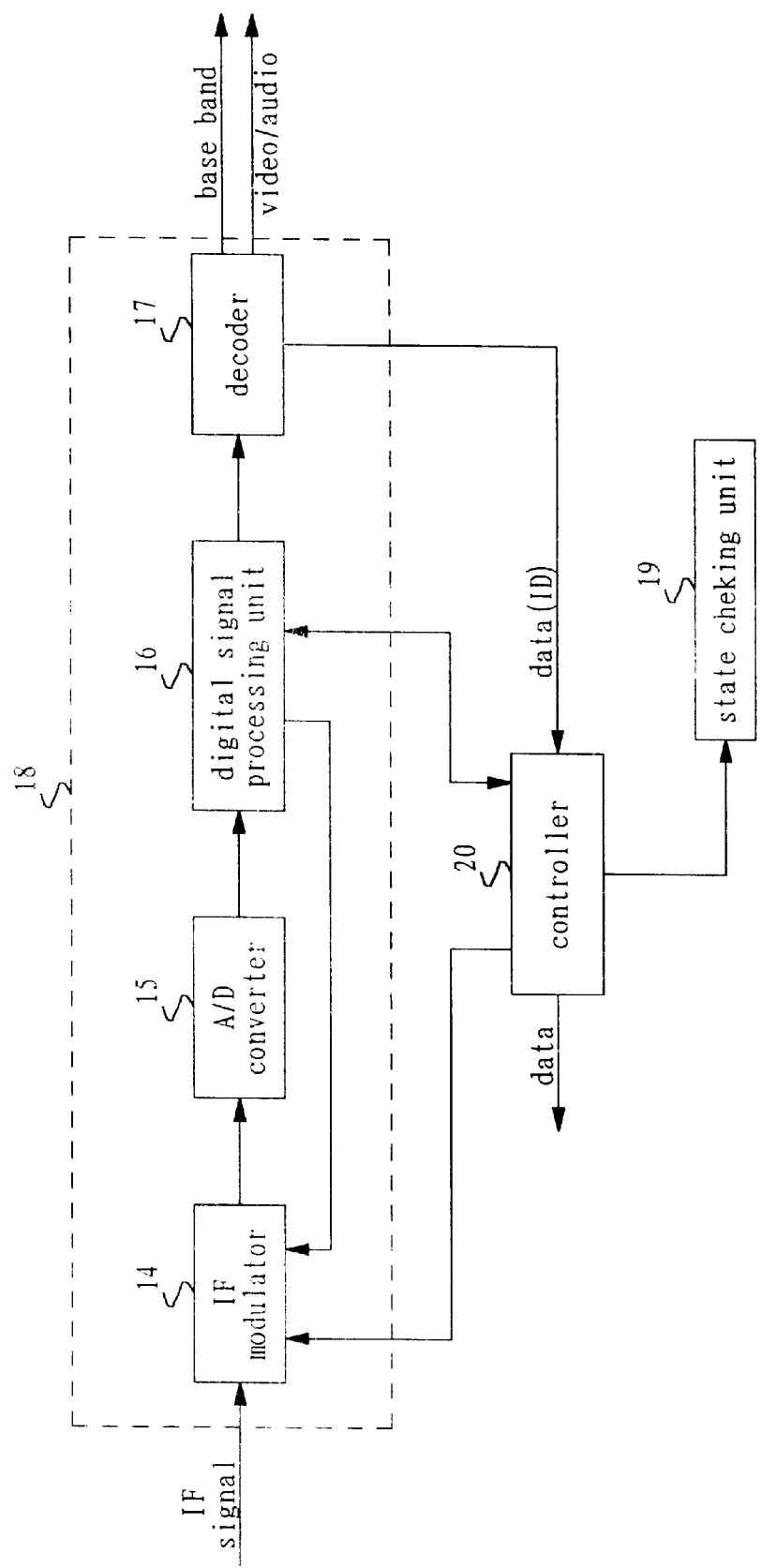

FIGS. 2A and 2B illustrate a receiving unit of a remote control apparatus for a digital CATV system according to the present invention. As shown therein, the receiving unit of a remote control apparatus for a digital CATV system according to the present invention includes a diplex filter 11 for preventing an upward signal from being influenced by a downward signal from the HE through the transmitting network, which HE acts as a transmitting unit, a tuner 12 for tuning an RF downward signal from the diplex filter 11 and outputting an IF signal, a signal separator (directional coupler) 13 for transmitting the downward signal from the diplex filter 11 to the tuner 12 and an additionally connected external terminal (through output port), a signal processing unit 18 for processing an output signal from the tuner 12 and outputting a base band video and audio signal and a control signal ID, a state checking unit 19 for outputting a state checking signal for the receiving unit, a controller 20 for controlling the receiving unit in accordance with the control signal ID which is separated by the signal processing unit 18 and outputting a state checking signal from the state checking unit 19, and a slave modem 21 for QPSK-modulating the state checking signal from the controller 20 and outputting to the diplex filter 11.

Here, the signal from the transmitting unit to the receiving unit is called a downward signal and the signal from the receiving unit to the transmitting unit is called an upward signal.

In addition, the signal processing unit 18 includes an IF modulator 14 and an A/D converter 15 for modulating the output signal from the tuner 12 and converting the thusly modulated output signal into a digital signal and a digital signal processing unit 16 and a decoder 17 for digital-signal-processing the output signal from the A/D converter 15 and decoding the same and outputting a base band video, audio signal, and a control signal ID.

The diplex filter 11 and the low pass filter LPF are formed in a form of a plug-in-module so that the same are installed in a channel board of the receiving unit, and the slave modem 21 is configured in a form of a plug-in-module.

When controlling the receiving unit using the remote controller 6 of the HE which is the output unit of the transmitting unit, when a receiving unit control signal is transmitted to the master modem 5 through an RS-232C or RS-422 cable, the master modem 5 transmits the same to the MPEG encoder 1.

Therefore, the MPEG encoder 1 encodes the control signal when encoding the base band and the video/audio signal and outputs to the MPEG transport stream TS.

The MPEG transport stream TS is modulated by the VSB/QAM modulator 2, and the signal from each channel is multiplexed by the multiplexer 3 and is transmitted to the transmission network through the diplex filter 4.

The signal from the HE which is the output unit of the transmitting unit is inputted into the tuner 12 through the diplex filter 11, the band pass filter (BPF), and the signal separator 13 and is outputted as an IF signal.

Here, the signal separator 13 is used for an external terminal which may be operable by installing an additional analog converter and VSB/QAM receiving unit.

In addition, the IF signal is modulated by the signal processing unit 18 and the IF modulator 14, and is converted into a digital signal by the A/D converter 15, and is processed by the digital signal processing unit 16 and decoded by the decoder 17 and is outputted as a base band video/audio signal.

The decoder 17 detects an ID from the HE which is an output unit of the transmitting unit when decoding an input signal and inputs the same into the controller 20. The controller 20 controls the receiving unit in accordance with the control signal.

The controller 20 outputs the state checking signal from the receiving unit which is checked by the state checking unit 19 to the slave modem 21, and the slave modem 21 QPSK-modulates the signal and outputs the same to the diplex filter 11 through the pass low pass filter LPF, and the diplex filter 11 outputs the signal through the transmission network.

The diplex filters 4 and 11 are used for preventing any influence from the upward signal and downward signal at the time of transmitting a downward signal to the receiving unit in the HE which is the output unit of the transmitting unit and at the time of transmitting an upward signal from the receiving unit to the HE which is the output unit of the transmitting unit.

The state checking signal transmitted to the transmission network through the diplex filter 11 is inputted into the master modem 5 through the diplex filter 4 of the HE which is the output unit of the transmitting unit and then is demodulated. Thereafter, the signal is inputted into the remote controller 6 and is used for monitoring the state checking of the receiving unit.

The above-described operation will now be explained in more detail with reference to FIGS. 3 and 4.

Figure 3:
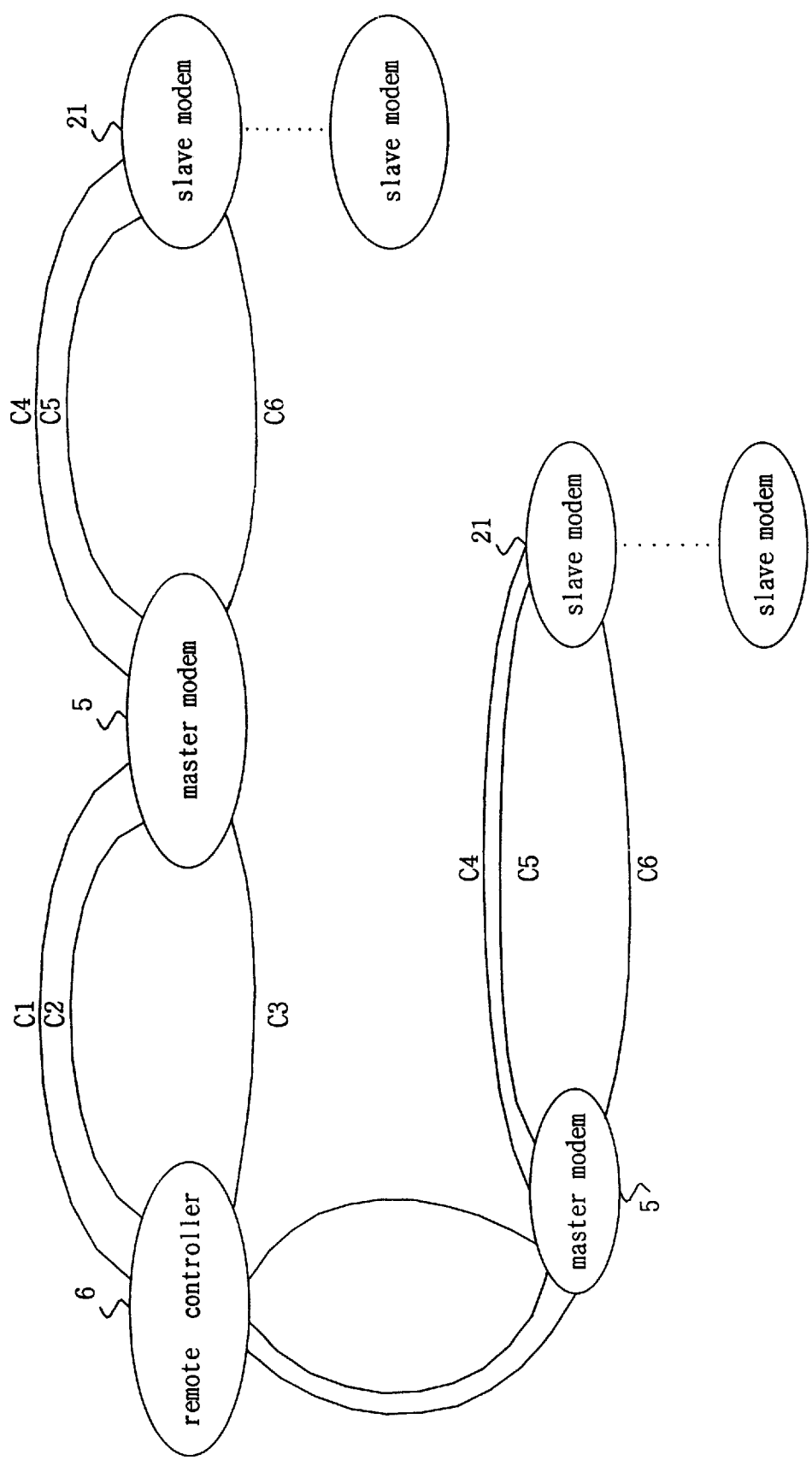
FIG. 3 is a flow chart collectively illustrating a remote control method for a digital cable television according to the present invention.
Figures 4A, 4B:
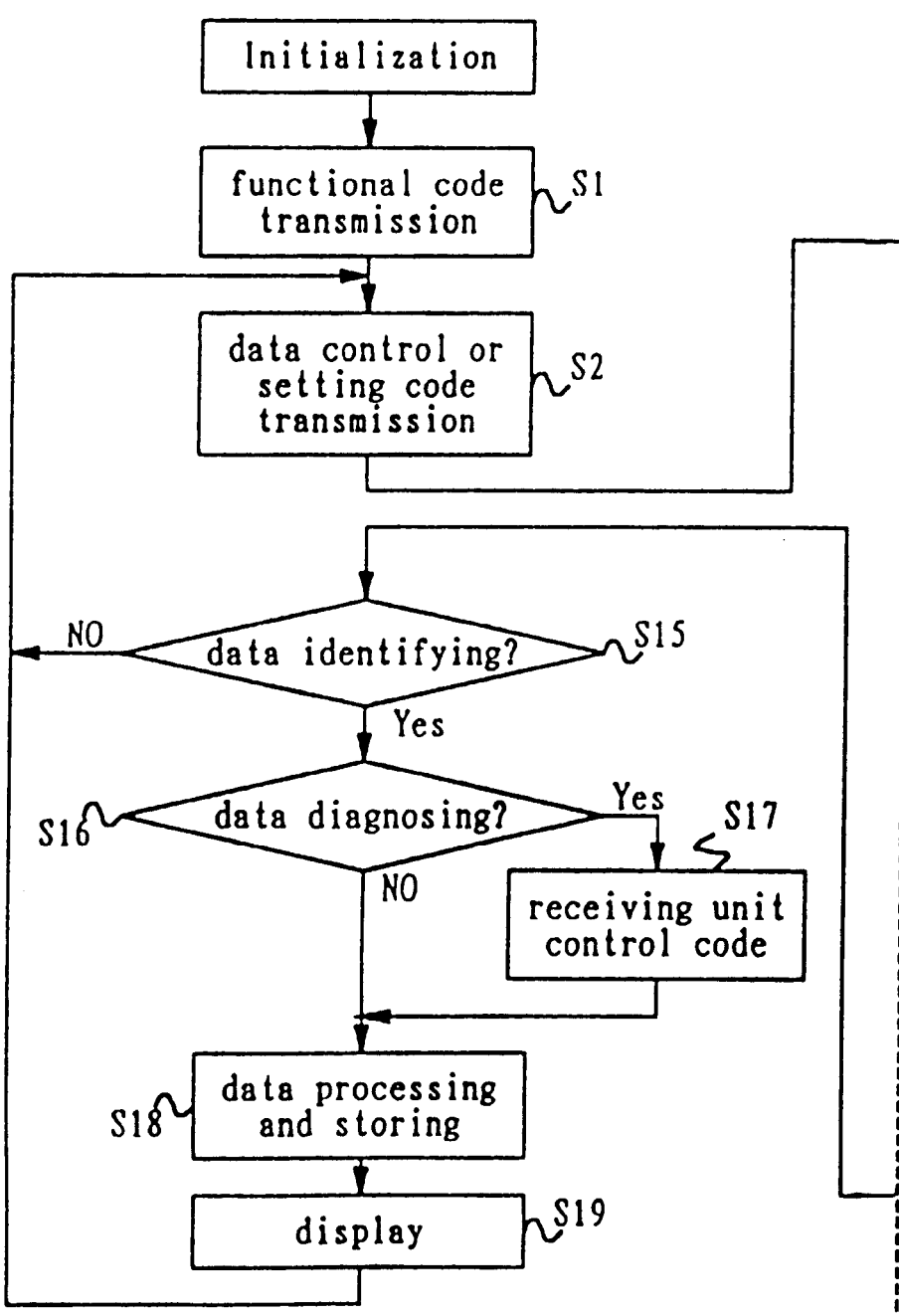
FIG. 4 is a detailed flow chart illustrating a remote control method for a digital cable television according to the present invention.

First, FIG. 3 illustrates a flow chart of a remote control method for a digital CATV system according to the present invention. The remote controller 6 monitors the operational state of the receiving unit and displays the operational state of the receiving unit. In addition, a parameter value of the receiving unit is corrected by the HE which is the output unit of the transmitting unit and remotely controls the operational state of the receiving unit, so that the entire network is effectively used in the center. In addition, the operational state of the receiving unit is remotely monitored, whereby the entire system is more easily managed and maintained.

In addition, the master modem 5 polls the remote controller 6 and the VSB/QAM receiving unit in accordance with a function code C1 and a data control or a setting code C2 and receives a data which is checked by the receiving unit, thus performing a function of transmitting data to the remote controller 6.

The data is analyzed by the remote controller 6. As a result of the analysis, if an error occurs in the receiving unit, a data control signal (initializing code) is transmitted to the receiving unit. In addition, an interface is provided so that the receiving unit is remotely controlled by transmitting an initialization setting value of the receiving unit.

The functional code C1 is used for transmitting polling information so that the remote controller 6 transmits a group polling, an individual polling, sequence polling state, etc. to the master modem, and the receiving unit is polled in accordance with the functional code C1 in the master modem 5.

The data control signal of the data control or setting code C2 is used so that the data received from the master modem 5 is analyzed, and the data control data is transmitted to the receiving unit when an error occurs, and the initialization setting value (setting code) is transmitted so that the receiving unit is remotely controlled.

In addition, the data receiving signal C3 is a signal for transmitting the data received from the slave modem 21 from the master modem 5 to the remote controller 6.

The data receiving signal C3 is a signal for transmitting the data from the slave modem 21 to the remote controller 6 in the master modem 5.

The slave modem 21 receives a data request signal C4 from the master modem 5 and checks the operational state of the receiving unit in the controller 20 and transmits the stored data to the master modem 5. In addition, a data control signal C5 is received for initializing the receiving unit, and a setting code is received for down-loading the initialization setting value with respect to the receiving unit.

The data request signal C4 is a signal for transmitting a polling signal to the slave modem 21 in accordance with a functional code C1 and a data control or a setting code C2 from the remote controller 6 in the master modem 5.

A data transmission signal C6 is a signal for transmitting a data value processed by the controller 20 to the master modem 5 in accordance with a data request and data control or setting code data from the slave modem 21 in the master modem 5.

The control steps of the remote controller 6, the master modem 5, the slave modem 21 and the controller 20 will now be explained with reference to FIG. 4.

In the remote controller 6, Steps S1, S2, and S15 through S19 are performed, and in the master modem 5, Steps S3, S4 and S12 through S14 are performed, and in the slave modem 21, Steps S5 through S11 are performed.

After an initializing step is performed, when the functional codes such as the group polling, the individual polling, and the sequence polling are transmitted to the master modem 5 in Step S1, and in the master modem 5, polling information is transmitted so that the receiving unit is polled in accordance with a functional code in the master modem 5.

After Step S1 is performed, the data control or setting code transmission is performed. The data control signal is used to transmit a resetting code to the receiving unit when an error occurs in the receiving unit, and a setting code (initialization setting value) value is transmitted to the receiving unit for remotely controlling the receiving unit in Step S2.

After the master modem 5 is initialized, it is judged that whether the data received in Step S2 of the remote controller 6 is to request the data or a data control or setting code in Step S3. As a result of the judgement, if the data corresponds to the data for requesting a data, the data is directly transmitted to the slave modem 21. As a result of the judgement, if the data corresponds to data for requesting the data control or setting code, after the receiving unit data control or setting code is transmitted in Step S4, the data is transmitted to the slave modem 21.

In Step S4, the receiving unit data control or setting code data are used for transmitting the data control data to the slave modem 21 when an error occurs in the receiving unit, thus initializing the receiving unit, and the receiving unit is controlled by transmitting the setting code data (initialization setting value) for remotely controlling the receiving unit.

In addition, in the slave modem 21, the master modem 5 is requested to re-send a data transmission in Step S6 based on the data received in Steps S3 and S4 of the master modem 6 and an ID identification step of Step S5 if there is an error in the received data, and if there is not an error in the data received, it is judged that whether the data received from the master modem 6 corresponds to a data for requesting the data or the data control or setting code in Step S7. As a result of the judgement, if the data corresponds to a data for requesting the data, the receiving unit data control or setting code step S8 is performed, otherwise in a state checking data transmission step S11, the data is transmitted.

Next, in Step S8, after the receiving unit setting code is received, the receiving unit is initialized, and in a state that the data is collected, Step S7 is performed.

Here, in the data collecting step S10, the data is collected from the transport module (state checking module) and is stored in the memory.

In the state checking data transmission step S11, a result of the operational state and data control or setting code of the receiving unit is transmitted to the master modem 5.

In the master modem 5, the data received from the slave modem 21 through the data identifying step S12 is analyzed, and it is checked if there is an error. If there is an error, the data re-transmission request step S13 is performed. If there is not an error, the state checking data transmission step S14 is performed.

Here, in the data re-transmission request step S13, if there is an error in the data received from the slave modem 21, data is transmitted to request a data re-transmission to the slave modem 21 through Step S3.

In the state checking transmission step S14, since there is not an error in the data received from the slave modem 21, data is transmitted to the remote controller 6.

Therefore, in the remote controller 6, in Step S15, the data received from the master modem 5 is checked. As a result of the checking, if there is not an error in the data, a data diagnostic step is performed in Step S16, and if there is an error in the operational state, a receiving control code step S17 is performed. If there is not an error, a data processing and storing step S18 is performed.

In the receiving control code step S17, the received data is analyzed. If an error occurs in the receiving unit, control data is transmitted to the receiving unit through the master modem 5.

In the data processing and storing step S18, the data received from the data diagnostic step S16 is processed, and is stored in the memory and displayed on the monitor in Step S19.

As described above, a monitoring operation and operational state of the receiving unit is remotely checked in the HE which is a transmitting unit. Therefore, it is possible to effectively manage the network and subscriber's receiving unit.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A remote control apparatus for a digital cable television (CATV) system, comprising:

a transmitting means for carrying a control signal on an MPEG transport stream of each channel for a remote control of a high definition television (HDTV) VSB/QAM receiving unit and transmitting the same, and remotely monitoring and controlling a state of the HDTV VSB/QAM receiving unit in accordance with a state checking signal from the HDTV VSB/QAM receiving unit; and a receiving means for receiving a control signal from the transmitting means, controlling the HDTV VSB/QAM receiving unit, modulating a state checking signal from the HDTV VSB/QAM and transmitting the thusly modulated signal to the transmitting means.

2. The apparatus of claim 1, wherein said transmitting means includes:

an MPEG encoder for encoding a base band and video/audio signal of each channel into the MPEG transport stream;

a VSB/QAM modulator for modulating an output signal from the MPEG encoder;

a multiplexer for multiplexing an output signal from the VSB/QAM modulator of each channel;

a diplex filter for preventing an upward signal from being influenced when transmitting the output signal from the multiplexer to the receiving unit through the transmission network;

a master modem for demodulating a signal from the receiving unit through the diplex filter and outputting a transmission signal to the MPEG encoder; and a remote controller connected with the master modem through a communication cable for remotely monitoring a state of the HDTV VSB/QAM receiving unit in accordance with a state checking signal from the HDTV VSB/QAM receiving unit through the master modem.

3. The apparatus of claim 2, wherein said master modem polls a HDTV VSB/QAM receiving unit in accordance with a functional code and a data control or a setting code, receives a data which is checked by the HDTV VSB/QAM receiving unit and transmits the data to the remote controller.

4. The apparatus of claim 1, wherein said receiving means includes:

a diplex filter for preventing an upward signal from being influenced by a downward signal received from the head end through a transmission network which head end is an output unit of the transmitting unit;

a tuner for tuning the downward signal from the diplex filter and outputting an IF signal;

a signal separator for a downward signal from the diplex filter to the tuner and an additionally connected external terminal;

a signal processor for processing an IF signal from the tuner and outputting a base band, video/audio signal, and a control signal;

a state checking unit for outputting a state checking signal of the HDTV VSB/QAM receiving unit;

a controller for controlling the HDTV VSB/QAM receiving unit in accordance with a control signal from the signal processing unit and outputting a state checking signal from the state checking unit; and a slave modem for QPSK-demodulating a state checking signal from the controller and outputting to the diplex filter.

5. The apparatus of claim 4, wherein said slave modem receives a data control signal through the master modem, initializes the HDTV VSB/QAM receiving unit, receives a setting code, and downloads an initialization setting value for the HDTV VSB/QAM receiving unit.

6. The apparatus of claim 4, wherein said diplex filter and slave modem are configured in a form of a plug-in-module for being installed in a channel board of the HDTV VSB/QAM receiving unit.

7. A remote control method for a digital cable television, comprising the steps of:

transmitting a functional code and data control code/setting code from a remote controller to a master modem after an initialization;

judging whether a data received is corrected by the master modem and transmitting a receiving unit data control or setting code to a slave modem in a correction mode;

identifying a data received and an ID, requesting a data re-transmission to a master modem when there is an error in the data received from the slave modem, judging whether the current mode is a correction mode when there is not an error therein, initializing a receiving unit after a receiving setting code is received when the current mode is a correction mode as a result of the judgement, correcting data, and transmitting the state checking data to the master modem when the current mode is not a correction mode;

identifying a data transmitted from the slave modem in the master modem, requesting a data re-transmission when there is not an error in the data and transmitting a state checking data to the remote controller when there is not an error; and checking and diagnosing the data transmitted thereto, performing a receiving unit control code when there is an error in the data, and processing, storing and displaying the data when there is not an error therein.

8. The method of claim 7, wherein in the correction mode of the master modem, it is judged that whether the data received from the remote controller corresponds to a data which requests only a data or a data control or setting code.

9. The method of claim 7, wherein in the correction mode of the master modem, it is judged that whether the data received from the master modem corresponds to a data which requests only a data or a data control or setting code.

* * * * *